US008964090B2

(12) United States Patent
Masuda et al.

(10) Patent No.: US 8,964,090 B2
(45) Date of Patent: *Feb. 24, 2015

(54) CONTROL APPARATUS, CONTROL METHOD, AND COMPUTER-READABLE RECORDING MEDIUM

(71) Applicant: Canon Kabushiki Kaisha, Tokyo (JP)

(72) Inventors: Hidetoshi Masuda, Yokohama (JP); Toshiaki Ueguri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,960

(22) Filed: Mar. 1, 2013

(65) Prior Publication Data

US 2013/0176444 A1   Jul. 11, 2013

Related U.S. Application Data

(63) Continuation of application No. 12/761,771, filed on Apr. 16, 2010, now Pat. No. 8,411,190.

(30) Foreign Application Priority Data

Apr. 21, 2009   (JP) .................. 2009-103138

(51) Int. Cl.
  H04N 5/222   (2006.01)
  H04N 5/225   (2006.01)
  H04N 5/232   (2006.01)
  H04N 1/00   (2006.01)
  H04N 101/00   (2006.01)

(52) U.S. Cl.
  CPC ........... *H04N 5/232* (2013.01); *H04N 1/00204* (2013.01); *H04N 1/00408* (2013.01); *H04N 1/0044* (2013.01); *H04N 5/23203* (2013.01); *H04N 5/23222* (2013.01); *H04N 2101/00* (2013.01)
  USPC ............... 348/333.01; 348/207.11; 348/211.7

(58) Field of Classification Search
  None
  See application file for complete search history.

(56) References Cited

U.S. PATENT DOCUMENTS

| | | | | |
|---|---|---|---|---|
| 6,819,355 | B1 * | 11/2004 | Niikawa | 348/207.11 |
| 7,098,943 | B2 * | 8/2006 | Shibutani | 348/211.1 |
| 7,505,065 | B2 * | 3/2009 | Oura et al. | 348/207.1 |
| 8,411,190 | B2 * | 4/2013 | Masuda et al. | 348/333.01 |
| 2009/0185039 | A1 * | 7/2009 | Hatanaka | 348/207.1 |

FOREIGN PATENT DOCUMENTS

| | | |
|---|---|---|
| JP | 2004-312378 A | 11/2004 |
| JP | 2008-085737 A | 4/2008 |

* cited by examiner

*Primary Examiner* — Luong T Nguyen

(74) *Attorney, Agent, or Firm* — Canon U.S.A., Inc. IP Division

(57) ABSTRACT

A control apparatus for controlling an image capture apparatus includes a communication unit and a control unit. The communication unit transmits a first command to the image capture apparatus if a predetermined area in a captured image received from the image capture apparatus and a pointer operated by an operation unit are overlapped. The communication unit transmits a second command to the image capture apparatus if a button of the operation unit is clicked in a state that the predetermined area and the pointer are overlapped.

30 Claims, 8 Drawing Sheets

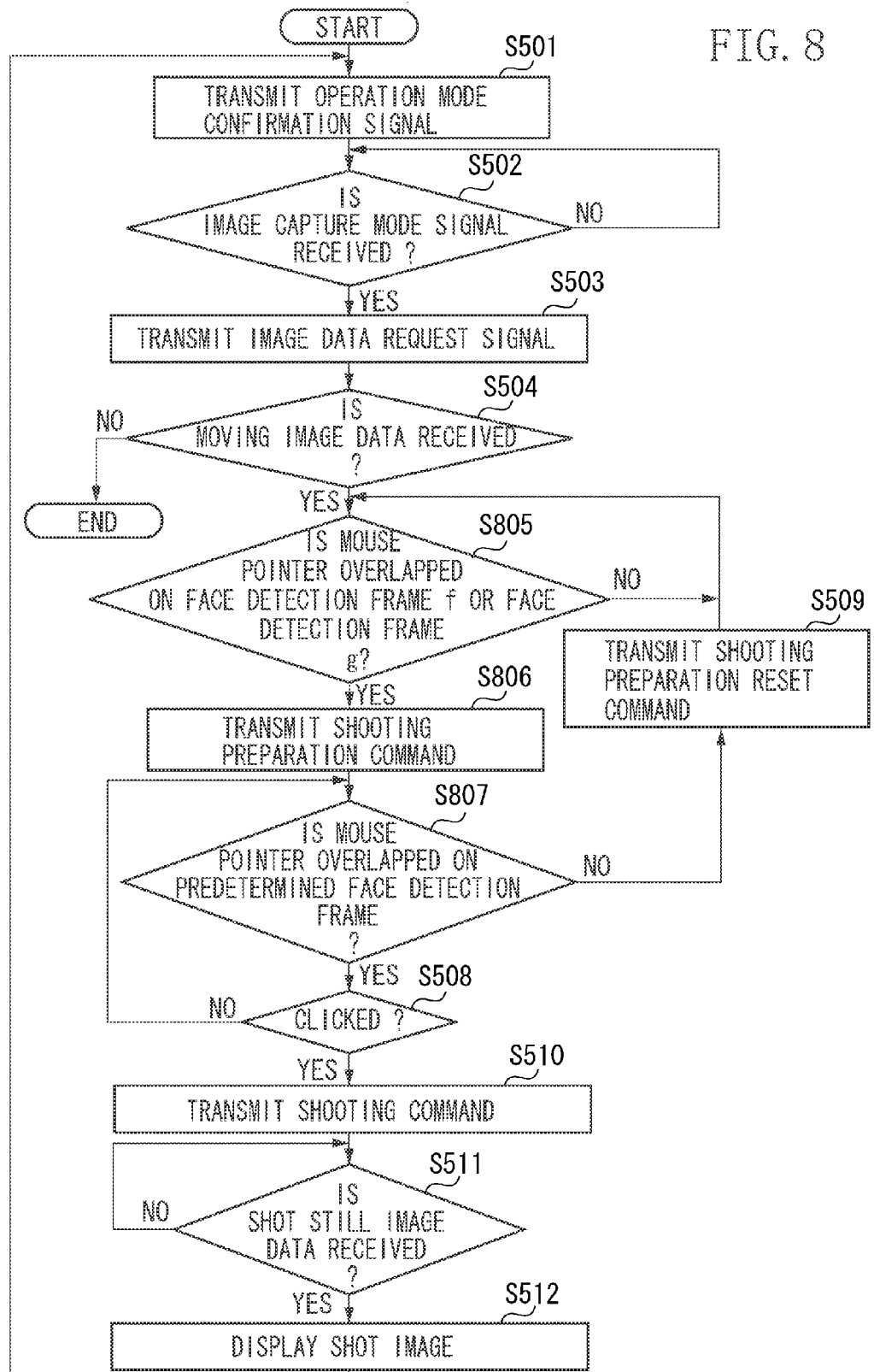

CONTROL APPARATUS, CONTROL METHOD, AND COMPUTER-READABLE RECORDING MEDIUM

This application is a continuation of application Ser. No. 12/761,771, filed on Apr. 16, 2010, which claims the benefit of Japanese Patent Application No. 2009-103138 filed Apr. 21, 2009, which are hereby incorporated by reference herein in their entirety.

BACKGROUND OF THE INVENTION

1. Field of the Invention

The present invention relates to a control apparatus for controlling an imaging apparatus, a control method, and a computer-readable recording medium.

2. Description of the Related Art

Japanese Patent Application Laid-Open No. 2005-210589 discusses a remote control system, in which a personal computer (PC) including a display and pointing devices, such as a mouse, connects to a digital camera with a cable, and remotely controls the digital camera.

In such a remote control system, a digital camera captures an image according to a shooting signal transmitted from a PC, and transmits captured image data to the PC. The PC receives the image data, and displays the image data on a display.

However, a user can only confirm the image data after performing shooting, on a display of a PC where the data are transmitted from the digital camera, and cannot confirm the image data on the display before the user captures the image with the digital camera. Therefore, there is a disadvantage that unintended image data is captured and the user cannot acquire the desired image data.

SUMMARY OF THE INVENTION

The present invention is directed to overcome the above-described drawback and disadvantage.

The present invention is directed to a remote control system by which a user can acquire desired image data.

According to an aspect of the present invention, there is provided a control apparatus for controlling an image capture apparatus, comprising: a communication unit that receives a captured image transmitted from the image capture apparatus; and a control unit that controls the control apparatus to display the captured image received by the communication unit in an image display area, wherein the control unit controls the control apparatus to display information indicating a predetermined area on the captured image displayed in the image display area, wherein the control unit determines whether or not the predetermined area and a pointer operated by an operation unit are overlapped, wherein the communication unit transmits a first command to the image capture apparatus if the control unit determines that the predetermined area and the pointer are overlapped, wherein the control unit determines whether or not a button of the operation unit is clicked in a state that the predetermined area and the pointer are overlapped, wherein the communication unit transmits a second command to the image capture apparatus if the control unit determines that the button of the operation unit is clicked in a state that the predetermined area and the pointer are overlapped, wherein the first command is a command for causing the image capture apparatus to perform a shooting preparation process based on an image within the predetermined area, and wherein the second command is a command for causing the image capture apparatus to perform a shooting process for capturing a still image.

According to another aspect of the present invention, there is provided a method of controlling a control apparatus for controlling an image capture apparatus, the method comprising: receiving a captured image transmitted from the image capture apparatus; displaying the captured image transmitted from the image capture apparatus in an image display area; displaying information indicating a predetermined area on the captured image displayed in the image display area; determining whether or not the predetermined area and a pointer operated by an operation unit are overlapped; transmitting a first command to the image capture apparatus if it is determined that the predetermined area and the pointer are overlapped; determining whether or not a button of the operation unit is clicked in a state that the predetermined area and the pointer are overlapped; and transmitting a second command to the image capture apparatus if it is determined that the button of the operation unit is clicked in a state that the predetermined area and the pointer are overlapped, wherein the first command is a command for causing the image capture apparatus to perform a shooting preparation process based on an image within the predetermined area, and wherein the second command is a command for causing the image capture apparatus to perform a shooting process for capturing a still image.

According to another aspect of the present invention, there is provided a computer-readable recording medium storing a program executed by a computer, wherein the program for using the computer to perform a method of controlling a control apparatus for controlling an image capture apparatus, the method comprising: receiving a captured image transmitted from the image capture apparatus; displaying the captured image transmitted from the image capture apparatus in an image display area; displaying information indicating a predetermined area on the captured image displayed in the image display area; determining whether or not the predetermined area and a pointer operated by an operation unit are overlapped; transmitting a first command to the image capture apparatus if it is determined that the predetermined area and the pointer are overlapped; determining whether or not a button of the operation unit is clicked in a state that the predetermined area and the pointer are overlapped; and transmitting a second command to the image capture apparatus if it is determined that the button of the operation unit is clicked in a state that the predetermined area and the pointer are overlapped, wherein the first command is a command for causing the image capture apparatus to perform a shooting preparation process based on an image within the predetermined area on which the pointer is overlapped, and wherein the second command is a command for causing the image capture apparatus to perform a shooting process for capturing a still image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating an example of process performed by a control apparatus according to the second exemplary embodiment of the present invention.

DESCRIPTION OF THE EMBODIMENTS

Various exemplary embodiments, features, and aspects of the invention will be described in detail below with reference to the drawings.

Figure 1:
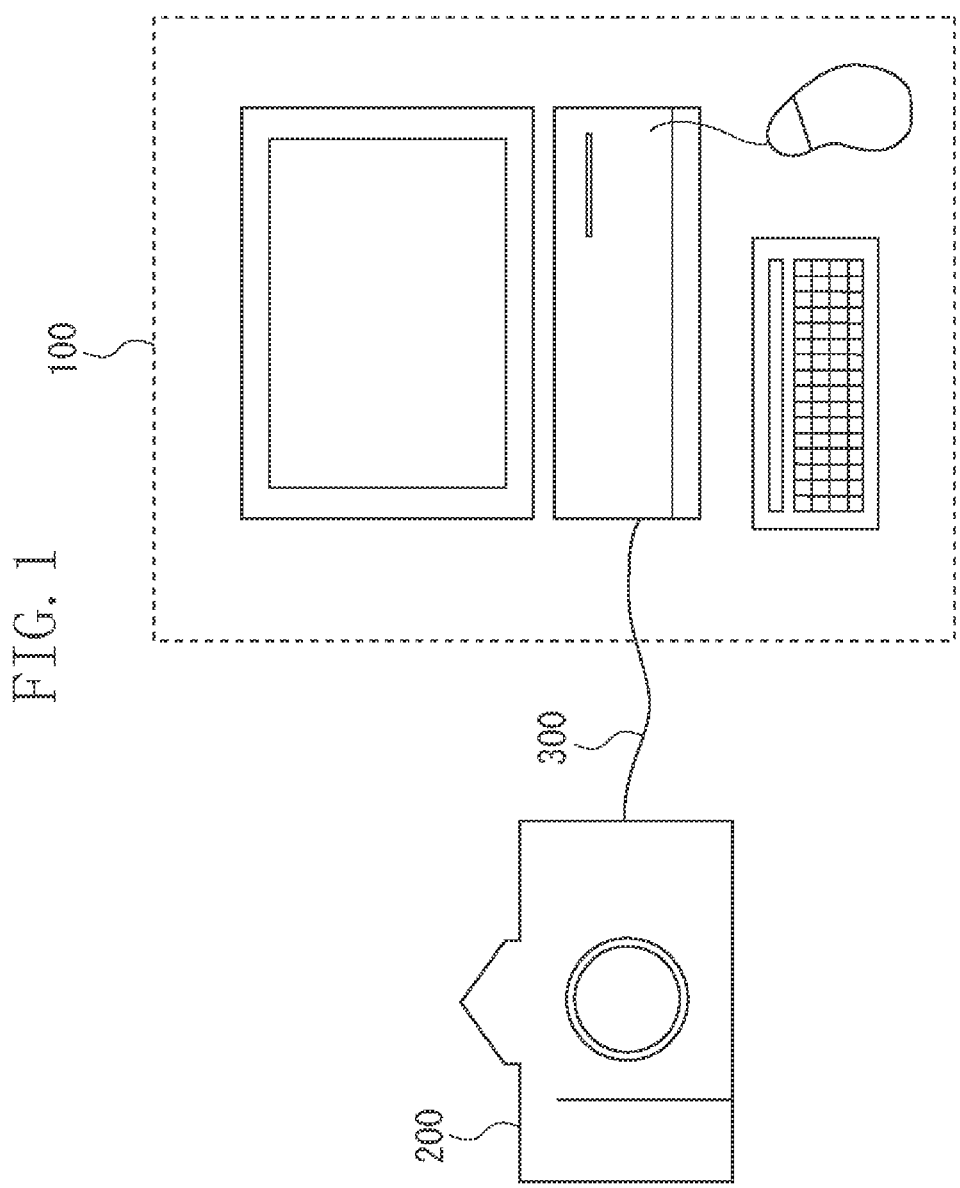
FIG. 1 illustrates an example of a remote control system according to the first and second exemplary embodiments of the present invention.
Figure 2:
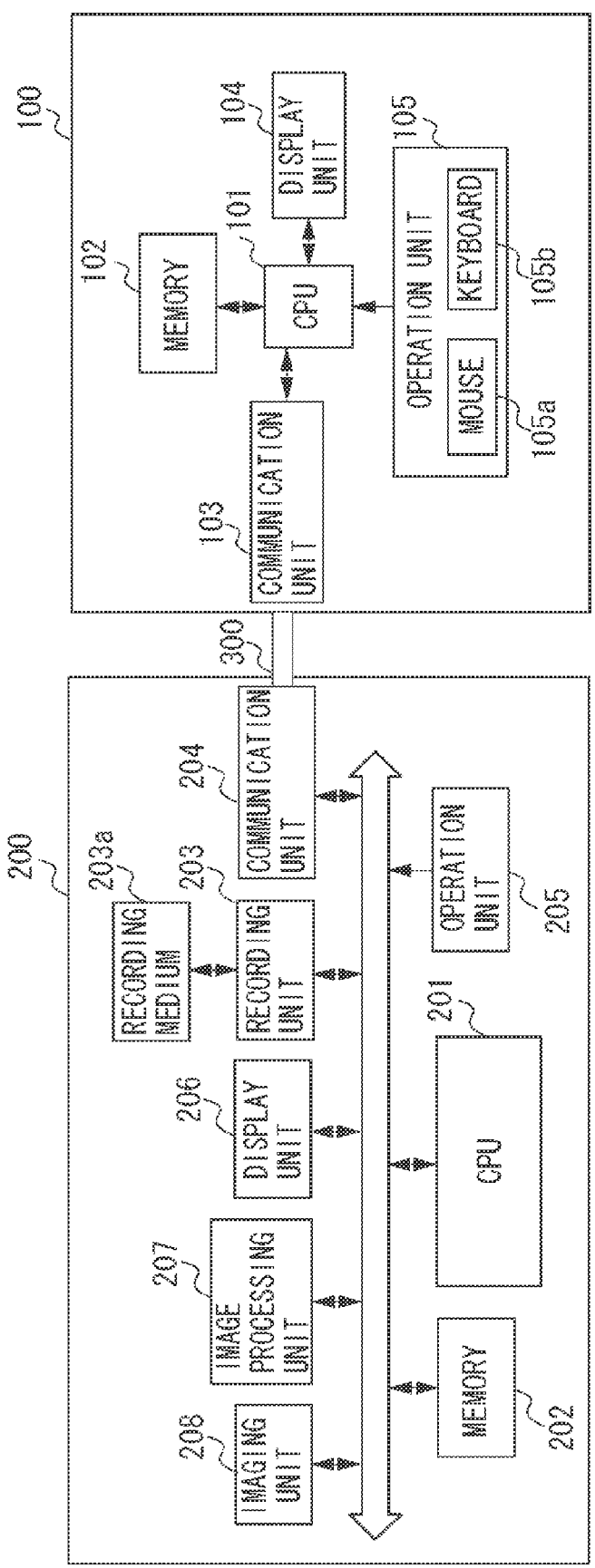
FIG. 2 is a block diagram illustrating a schematic configuration of a remote control system according to the first exemplary embodiment of the present invention.

FIG. 1 illustrates an example of a remote control system according to the first exemplary embodiment of the present invention. FIG. 2 is a block diagram illustrating an example of a schematic configuration of a remote control system according to the first exemplary embodiment of the present invention. As illustrated in FIGS. 1 and 2, the remote control system according to the first exemplary embodiment includes a control apparatus 100, a connection cable 300, and an image capture apparatus 200. The control apparatus 100 and the image capture apparatus 200 are connected each other via a transmission path such as the connection cable 300.

In the first exemplary embodiment, a personal computer (hereinafter referred to as PC) is used as an example of the control apparatus 100, and a digital single lens reflex camera (hereinafter referred to as a camera) is used as an example of the image capture apparatus 200. Further, in the first exemplary embodiment, a universal serial bus (USB) cable according to a USB standard is used as an example of the connection cable 300.

The first exemplary embodiment will be described in detail below.

The USB cable 300 includes a data line for bidirectionally transmitting data, a strobe signal line for transferring a strobe signal, and a power supply line.

In the data line, a protocol for controlling the camera 200 connecting to the PC 100 is provided. By using this protocol, a user can transfer various data and control between apparatuses of the USB-compliant PC 100 and the camera 200.

The strobe signal line is a line for transmitting a strobe signal. The strobe signal is a signal indicating that data are being output from an apparatus side that transmits the data to an apparatus side that receives the data. Further, the data transfer is performed at both a rise time and a fall time of a strobe signal. An apparatus receiving the data generates data which is transmitted through the data line and the strobe signal line.

The power supply line supplies power from the PC 100 to the camera 200 if necessary.

In addition, the connection cable 300 is not limited to the USB cable. Any connection cable other than the USB cable can be used if the connection cable has a line for transmitting image data, sound data, and auxiliary data. Further, although the USB cable is used as the connection cable 300 for enabling communication between the PC 100 and the camera 200, the PC 100 and the camera 200 can also be connected by wireless communication.

The PC 100 uses the monitor to display image data such as still image data and moving image data (video) transmitted from the camera 200, and to output audio data transmitted from the camera 200 from a speaker via the USB cable 300. Furthermore, the PC 100 generates a control command for controlling the camera 200 based on an input from a user, and transmits the control command to the camera 200 via the USB cable 300.

As illustrated in FIG. 2, the PC 100 includes a central processing unit (CPU) 101, a memory 102, a communication unit 103, a display unit 104, and an operation unit 105.

The CPU 101 controls an operation of the PC 100 according to a control program stored in the memory 102.

The memory 102 also functions as a main memory of the CPU 101, and stores data received by the camera 200 from the communication unit 103. Further, the memory 102 stores a plurality of icons for notifying a state of the PC 100 to a user, and a control program for controlling the operation of the PC 100. Furthermore, the memory 102 stores information of a menu screen to be displayed on the display unit 104.

The communication unit 103 has a terminal for connecting the USB cable 300. The communication unit 103 can receive image data, sound data, and auxiliary data, which are transmitted from the camera 200 via the USB cable 300. The image data transmitted from the camera 200 is stored in the memory 102, and then displayed in the display unit 104. The sound data transmitted from the camera 200 is output from a speaker which is not illustrated. The auxiliary data transmitted from the camera 200 is supplied to the CPU 101.

The display unit 104 is configured with a=monitor such as a liquid crystal display. The display unit 104 can display image data supplied from at least one of the memory 102 and the communication unit 103.

Further, the display unit 104 can display a menu screen stored in the memory 102. The menu screen includes a PC control screen for controlling the PC 100, a PC setting screen for changing setting of the PC 100, or a camera control screen 400 for controlling the camera 200, which is illustrated in FIG. 3. The camera control screen 400 will be described in detail below.

In addition, when the menu screen is displayed in the display unit 104, a mouse pointer (an icon having the shape of an arrow) 500 is displayed on the menu screen. The mouse pointer 500 performs inputting to a button and a scroll bar which are displayed on the menu screen, and moves on the menu screen. Therefore, in order to know the position of the mouse pointer 500 on the menu screen, the CPU 101 acquires coordinate information of the mouse pointer 500 which indicates a position of the mouse pointer 500.

The CPU 101 performs control to display image data supplied from the communication unit 103 in a predetermined area of the camera control screen 400 displayed in the display unit 104.

The operation unit 105 is a user interface for operating the PC 100. Further, the operation unit 105 includes, as an operation means for operating PC 100, pointing devices such as a mouse 105a, a tablet, a trackball, and a trackpad, and a keyboard 105b.

By operating these pointing devices, a user can control the PC 100 while the mouse pointer 500 moves on the menu screen. The mouse pointer 500 is overlapped on the menu screen, and an operation is performed on the button or the scroll bar. For example, the coordinate of the mouse pointer 500 changes according to the position information of the pointing devices, and the position of the mouse pointer 500 on the menu screen is moved. When the pointing device is clicked (pressed), the mouse pointer 500 performs inputting, and process is performed corresponding to an area in which the mouse pointer 500 is displayed.

Similarly, by operating the keyboard 105b, a user can control the PC 100 while the mouse pointer 500 moves on the menu screen. The mouse pointer 500 is overlapped on the menu screen, and an operation is performed on the button or the scroll bar. For example, the user operates a cross key of the keyboard 105b to move the position of the mouse pointer 500, and presses an Enter key of the keyboard 105b to perform inputting by the mouse pointer 500.

FIG. 3 illustrates the camera control screen 400 as one example of a menu screen. When a user executes software which operates the camera 200 in a windows system normally used in an operating system (OS) of the PC 100, the camera control screen 400 is displayed on the display unit 104.

The camera control screen 400 is a window for remotely controlling the camera 200. The camera control screen 400 includes a view area 401, a status display area 402, and a parameter area 403. The CPU 101 performs control to display the data received from the camera 200 in the communication unit 103 on the view area 401 and the parameter area 403 respectively.

In addition, in the camera control screen 400, when a user operates the mouse pointer 500 to overlap it on a predetermined area or clicks (presses) the pointing device, the CPU 101 generates a command for controlling the camera 200.

The view area 401 is an image display area for displaying image data which the communication unit 103 receives from the camera 200. The view area 401 displays a live view image which is moving image data continuously transmitted from the camera 200, or displays still image data after shooting which is transmitted from the camera 200. On the live view image displayed in the view area 401, range-finding frames a to e are superimposed. The number of the range-finding frames is not limited to the number of range-finding frames illustrated in FIG. 3. The range-finding frames a to e will be described below.

By performing an operation on the range-finding frames a to e by the mouse pointer 500, a user can control the camera 200 to perform process concerning the shooting. The shooting process includes a shooting preparation and the shooting. The shooting preparation is process which the camera 200 performs in a state S1 where a shutter button of the camera 200 is half-pressed. The shooting is process which the camera 200 performs in a state S2 where the shutter button of the camera 200 is full-pressed.

When an operation mode of the camera 200 is a normal image capture mode, and when the mouse pointer 500 is overlapped on at least one of the range-finding frames a to e, the PC 100 transmits, to the camera 200, a shooting preparation command for instructing the camera to start the shooting preparation. The camera 200 which has received the shooting preparation command from the PC 100 executes the shooting preparation process corresponding to a range-finding area surrounded by one of the range-finding frames a to e on which the mouse pointer 500 is overlapped.

When the camera 200 is in a image capture mode, and when a pointing device is clicked (pressed) in a state where the mouse pointer 500 is overlapped on one of the range-finding frames from a to e, the PC 100 transmits the shooting command for instructing the camera to start shooting process, to the camera 200. The camera 200 which has received the shooting command from the PC 100 executes the shooting process. However, if the pointing device is clicked (pressed) while the mouse pointer 500 is in an area other than the range-finding frames a to e, the PC 100 does not instruct the camera 200 to start a shooting preparation and the shooting. In this case, the camera 200 does not execute the shooting preparation and the shooting. The shooting preparation process and the shooting process will be described below. When the communication unit 103 cannot perform data communication with the camera 200, or when the camera 200 does not transmit image data, image data is not displayed in the view area 401.

Figure 3A:
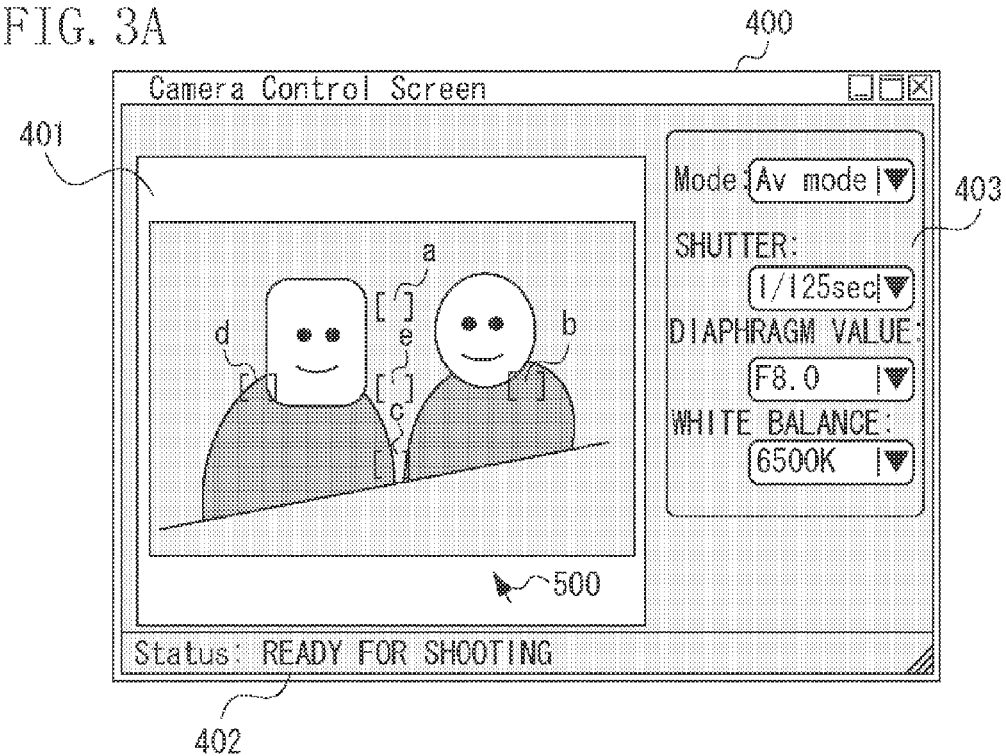
FIGS. 3A and 3B illustrate an example of a camera control screen displayed in a control apparatus according to the first exemplary embodiment of the present invention.
Figure 3B:
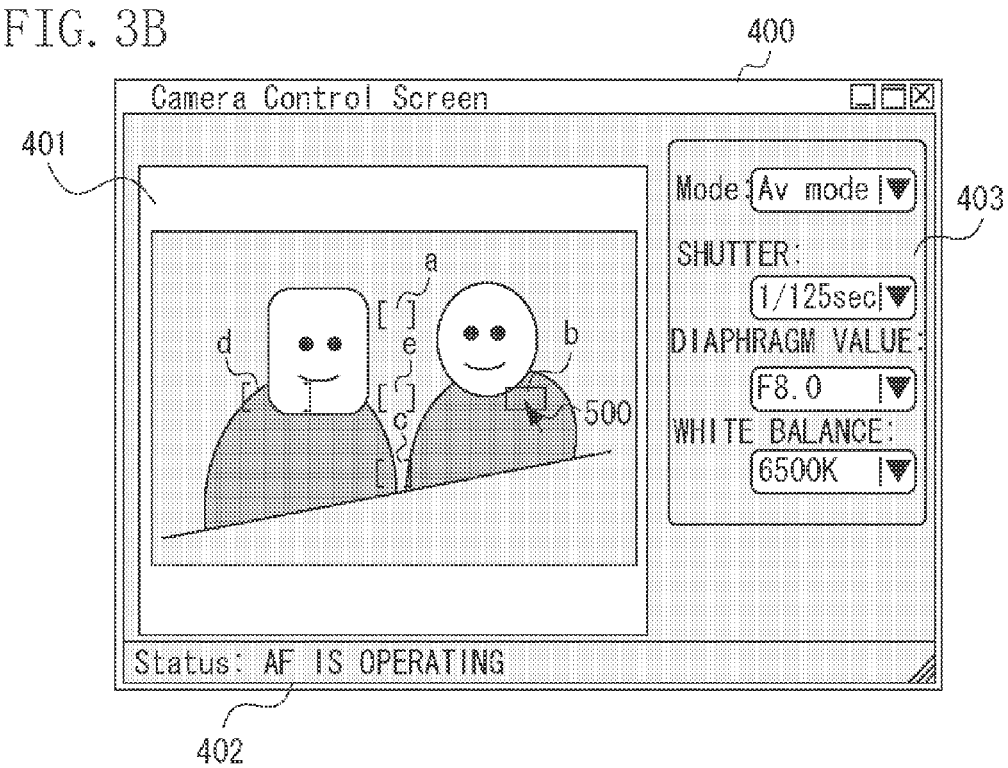

The status display area 402 is an area displaying a state of the camera 200 with character information. In FIG. 3A, the status display area 402 displays "READY FOR SHOOTING". In addition to this, as illustrated in FIG. 3B, the status display area 402 displays "AUTO-FOCUS (AF) IS OPERATING", "AUTOMATIC EXPOSURE (AE) IS OPERATING", or "IN SHOOTING PROCESS". The memory 102 records the character information indicating the state of the camera 200, such as "READY FOR SHOOTING", "AF IS OPERATING", "AE IS OPERATING", and "IN SHOOTING PROCESS".

The CPU 101 displays the character information read from the memory 102 according to the state of the camera 200 in the status display area 402. When the communication unit 103 cannot perform data communication with the camera 200, the status display area 402 displays information indicating that shooting cannot be performed or communication with the camera 200 cannot be performed.

The parameter area 403 is an area displaying shooting parameters indicating setting of the camera 200 at a time of shooting. The shooting parameters are an operation mode, a shutter speed, a diaphragm value, and a white balance value, and these are displayed in a parameter area 403. These values are included in auxiliary data received from the camera 200. In the parameter area 403, setting of the camera 200 other than the shooting parameter can be displayed. When the communication unit 103 cannot perform data communication with the camera 200, the parameter area 403 does not display the shooting parameter.

The camera 200 is an image source capable of transmitting video data, audio data, and auxiliary data to the PC 100 via the USB cable 300. Further, the camera 200 receives a control command from the PC 100 via the USB cable 300, and executes process corresponding to the control command.

As illustrated in FIG. 2, the camera 200 includes a CPU 201, a memory 202, a recording unit 203, a communication unit 204, an operation unit 205, a display unit 206, an image processing unit 207, and imaging unit 208.

The camera 200 has operation modes such as an image capture mode and a playback mode. When the operation mode of the camera 200 is the image capture mode, the camera 200 can shoot an object, and can record shot image data such as moving image data or still image data in a recording medium 203a. When the operation mode of the camera 200 is a playback mode, the camera 200 can playback image data selected by a user from the recording medium 203a.

The CPU 201 controls an operation of the camera 200 according to a control program stored in the memory 202. The CPU 201 acquires information relating the PC 100 from the PC 100 via the USB cable 300, and stores the information in the memory 202. In addition, a work area of the CPU 201 is not limited to the memory 202. The work area can be an external storage apparatus such as a hard disk device.

The memory 202 functions as a work area of the CPU 201, and stores various values, data, and information which are used in the CPU 201. The information stored in the memory 202 includes a control program for controlling the camera 200, and predetermined image data, and an icon which are displayed in the display unit 206.

The communication unit 204 includes a terminal for connecting the USB cable 300. When an operation mode of the camera 200 is an image capture mode, the imaging unit 208 shoots an object, and generates image data from an optical image of the object. The image data generated by the imaging unit 208 is supplied to the communication unit 204, the image processing unit 207, and the display unit 206. Audio data generated by a microphone unit which is not illustrated is also supplied to the recording unit 203 and the communication unit 204. The communication unit 204 transmits the image data generated by the image processing unit 207, the audio data generated by the microphone unit which is not illustrated, and auxiliary data generated by the CPU 101, to the PC 100 via the USB cable 300. The communication unit 204 transmits a command generated by the CPU 201 to the PC 100 via the USB cable 300.

Further, the communication unit 204 receives a command transmitted from the PC 100 via the USB cable 300. When the communication unit 204 has received the command from the PC 100, the communication unit 204 supplies the received command to the CPU 101.

The operation unit 205 is a user interface for operating the camera 200, and includes a plurality of buttons for operating the camera 200. A user inputs instruction into the CPU 201 via the operation unit 205. Each of buttons in the operation unit 205 is configured with a switch panel or a touch panel. The operation unit 205 includes a shutter button, a power supply button, a start/stop button, a mode change button, a menu button, a cross button, and a setting (SET) button.

The shutter button has two states, i.e., a state 51 where the shutter button is half-pressed, and a state S2 where the shutter button is full-pressed. When an operation mode of the camera 200 is an image capture mode, and when the shutter button is pressed to be in the state S1, a signal for instructing the camera to perform the shooting preparation process is transmitted from the operation unit 205 to the CPU 201, and is input to the CPU 201. The CPU 201 instructs the image processing unit 207 and the imaging unit 208 to start the shooting preparation process.

When an operation mode of the camera 200 is an image capture mode, and when the shutter button is pressed to be in the state S2, a signal for instructing the camera to perform the shooting process is transmitted from the operation unit 205 to the CPU 201, and is input to the CPU 201. The CPU 201 instructs the image processing unit 207 and the imaging unit 208 to start an operation of a series of shooting process.

The power supply button is a button for instructing the CPU 201 to change a state of the camera 200 to a state where a power supply is turned on (ON) or off (OFF). The state where the power supply is turned on is a state which can supply needed power to each of units of the camera 200 from a power supply (not illustrated) such as a battery or an alternating current (AC) power supply. The state where the power supply is turned off is a state which stops to supply power to a part or entire of the camera 200 from a power supply (not illustrated) such as a battery or an AC power supply.

The moving image data is generated by the image processing unit 207 and the imaging unit 208. The start/stop button is a button for instructing the CPU 201 to start or pause recording of moving image data in the recording medium 203a.

The mode change button is a button for instructing the CPU 201 to change the operation mode of the camera 200 to one of an image capture mode, a playback mode, a valve image capture mode, and a continuous image capture mode.

The image capture mode is a single shooting mode to generate one still image data by the image processing unit 207 and the imaging unit 208 when the shutter button comes to be in the state S2. The valve image capture mode is a shooting mode to perform exposure for a longtime while opening a shutter, and generate still image data, while the shutter button is in the state S2. The continuous image capture mode is a shooting mode to continuously generate still image data while the shutter button is in the state S2.

The menu button is a button for instructing the CPU 201 to display or not to display a menu screen of the camera 200. The menu screen of the camera 200 includes a menu screen for controlling the camera 200, and a menu screen for changing setting of the camera 200. The memory 202 stores these menu screens.

The operation unit 205 includes a play button, a stop button, a pause button, a fast-forward button, and a rewind button. These buttons instruct the CPU 201 to execute operations of play, stop, pause, fast forward, and rewind of image data recorded in the recording medium 203a.

The display unit 206 is configured with a liquid crystal display. When an operation mode of the camera 200 is an image capture mode, the display unit 206 displays image data generated by the image processing unit 207. When an operation mode of the camera 200 is a playback mode, the display unit 206 displays image data which the recording unit 203 playbacks from the recording medium 203a.

The image processing unit 207 performs image process, such as pixel interpolating and color conversion, on the image data output from the imaging unit 208 or the image data read from the recording medium 203a by the recording unit 203. The image processing unit 207 includes a compression/expansion circuit, which compresses and expands the image data by adaptive discrete cosine transform (ADCT). The image processing unit 207 reads the image data stored in the memory 202, and performs compression or expansion on the image data.

The image processing unit 207 performs arithmetic process using the image data output from the imaging unit 208. Based on the arithmetic result, the CPU 101 controls through-the-lens (TTL) type auto-focus (hereinafter referred to as AF), an automatic exposure ((hereinafter referred to as AE), an electronic flash preliminary emission, and a TTL type auto white balance process.

The imaging unit 208 includes an image sensor, an analog/digital (A/D) conversion unit, and an optical system. The optical system is a shooting lens group. The shooting lens group includes a variator lens for raising a magnification of shooting, a focusing lens for adjusting a focus, a diaphragm for adjusting shooting light quantity, and a drive circuit for driving those.

The image sensor converts object light entering via the optical system to an image signal which is an electrical signal. The image sensor is, for example, a charge coupled device (CCD) image sensor and a complementary metal-oxide-semiconductor (CMOS) sensor. The A/D conversion unit converts an image signal (analog data) output from the image sensor to digital moving image data (image data), and outputs these data to the communication unit 204 or the image processing unit 207.

When the CPU 201 instructs the image processing unit 207 and the imaging unit 208 to start shooting preparation process, the CPU 201 controls the imaging sensor, A/D conversion unit, and the optical system in the imaging unit 208, and performs AF process and AE process. Further, the shooting preparation process includes, for example, electronic flash preliminary emission (hereinafter referred to as EF), auto white balance (hereinafter referred to as AWB), and image stabilization.

The AF process is process in which the CPU 201 performs position control of the focus lens in the imaging unit 208. In the AF process, the CPU 201 detects an in-focus position of the focus lens and adjusts the position of the focus lens. More particularly, while moving the focus lens from a position corresponding to an infinite distance to a position corresponding to the closest distance set by each operation mode, the CPU 201 controls the imaging sensor to acquire a plurality of image signals. Then, the CPU 201 controls the memory 202 to store measurement data and/or shooting parameters, and performs control to adjust the position of the focus lens (the in-focus position). The in-focus position is a position at which a high-frequency component extracted from the image signal comes to be the maximum.

In the AE process, a light metering value is acquired using the arithmetic result in the image processing unit 207 and exposure becomes proper. More particularly, the image processing unit 207 divides one frame of the image data output from the imaging unit 208 into a plurality of areas (for example, 16×16), integrates a red-green-blue (RGB) signal for every divided area, and provides the integrated value to the CPU 201.

The CPU 201 detects a degree of brightness of an object (an object luminance) based on the integrated value, and calculates a value of exposure which is the most proper for shooting. According to the exposure value, the CPU 201 determines a diaphragm value and a shutter speed. According to this operation, the CPU 201 controls the imaging sensor and the optical system, and acquires the proper amount of exposure. Further, when the CPU 201 determines that the exposure is proper, measurement data and/or shooting parameters such as the diaphragm value and the shutter speed are stored in the memory 202.

When the AF process and AE process are executed, in order to execute the AF process and the AE process at high speed, the AF process and the AE process can be performed in a range-finding area which is a pixel region partially selected from the entire pixel region of the imaging sensor. A frame surrounding the range-finding area is termed a range-finding frame. The image processing unit 207 calculates focus information relating to the range-finding frame from shooting parameters stored in the memory 202. Then, the image processing unit 207 superimposes the range-finding frame on the image data output from the imaging unit 208, and outputs the data. Therefore, the display unit 206 displays the image data on which the range-finding frame is superimposed.

Further, the image processing unit 207 adds the focus information to the image data output from the imaging unit 208, and outputs the image data to the communication unit 204. The image processing unit 207 can output, to the communication unit 204, the image data on which the range-finding frame is superimposed. The focus information includes coordinate information of the range-finding frame relative to the image data, an area of a region surrounded by the range-finding frame relative to the image data, and the number of the range-finding frames. In addition, the number of the range-finding frames superimposed on the image data and the position of the image data on which the range-finding frame is superimposed are not limited to examples illustrated in FIG. 3.

When one of the range-finding frames a to e displayed in the display unit 206 is selected, the CPU 201 performs the AF process. In the AF process, the CPU 201 detects an in-focus position, in which a high-frequency component extracted from an image signal of an area surrounded by the selected range-finding frame is the maximum, and then adjusts the position of the focus lens.

Further, when one of the range-finding frames a to e displayed in the display unit 206 is selected, the CPU 201 calculates an exposure value proper for shooting from a pixel area of the region surrounded by the selected range-finding frame based on the integrated value which is acquired by integrating the RGB signal. Then, the CPU 201 determines a diaphragm value and a shutter speed.

The EF process is process performed by the CPU 201 when the CPU 201 determines that flash is necessary according to the results of diaphragm value and shutter speed, which are determined by performing the AE process. When the CPU 201 determines that flash is necessary, a flash flag is set, and the flash is charged. The EF process includes a function of projecting AF auxiliary light and a flash light adjustment function.

The AWB process makes a color balance of a flash shooting image proper by measuring a color temperature of external light and a ratio of light amounts of external light and flash light from the recorded image. The image processing unit 207 calculates an average integrated value by color of the RGB signal for every divided area, and provides the calculated result to the CPU 201.

The CPU 201 receives the integrated value of red R, the integrated value of blue B, and the integrated value of green G, and acquires ratios of R/G and B/G for every divided area. The CPU 201 determines a kind of light source based on distributions of the values of R/G and B/G in color spaces of coordinates of a R/G axis and a B/G axis. The CPU 201 controls a correction value of white balance as to the R, G, and B signals according to the determined kind of light source, and then the CPU 201 corrects signals of each color channel. The corrections value of white balance as to the R, G, and B signals is stored in the memory 202.

The shooting preparation process is described above. Other process which is preferably executed before the shooting process may be performed as the shooting preparation process other than the aforementioned process. Further, the AWB process can be performed between the shooting preparation process and the shooting process.

When the CPU 201 instructs the image processing unit 207 and the imaging unit 208 to start the shooting process, the CPU 201 controls the image processing unit 207 and the imaging unit 208, and the shooting process is performed. After analog data output from the imaging sensor of the imaging unit 208 is converted to digital moving image data in the A/D conversion unit, the converted data is output as digital still image data to the imaging processing unit 207. Then, the image processing unit 207 compresses the digital still image data, and the compressed data is written in the recording medium 203a as still-image data.

The image capture apparatus 200 is not limited a digital single lens reflex camera. For example, the image capture apparatus 200 can be a video camera, a digital still camera, or a camera-equipped mobile phone.

Figure 4:
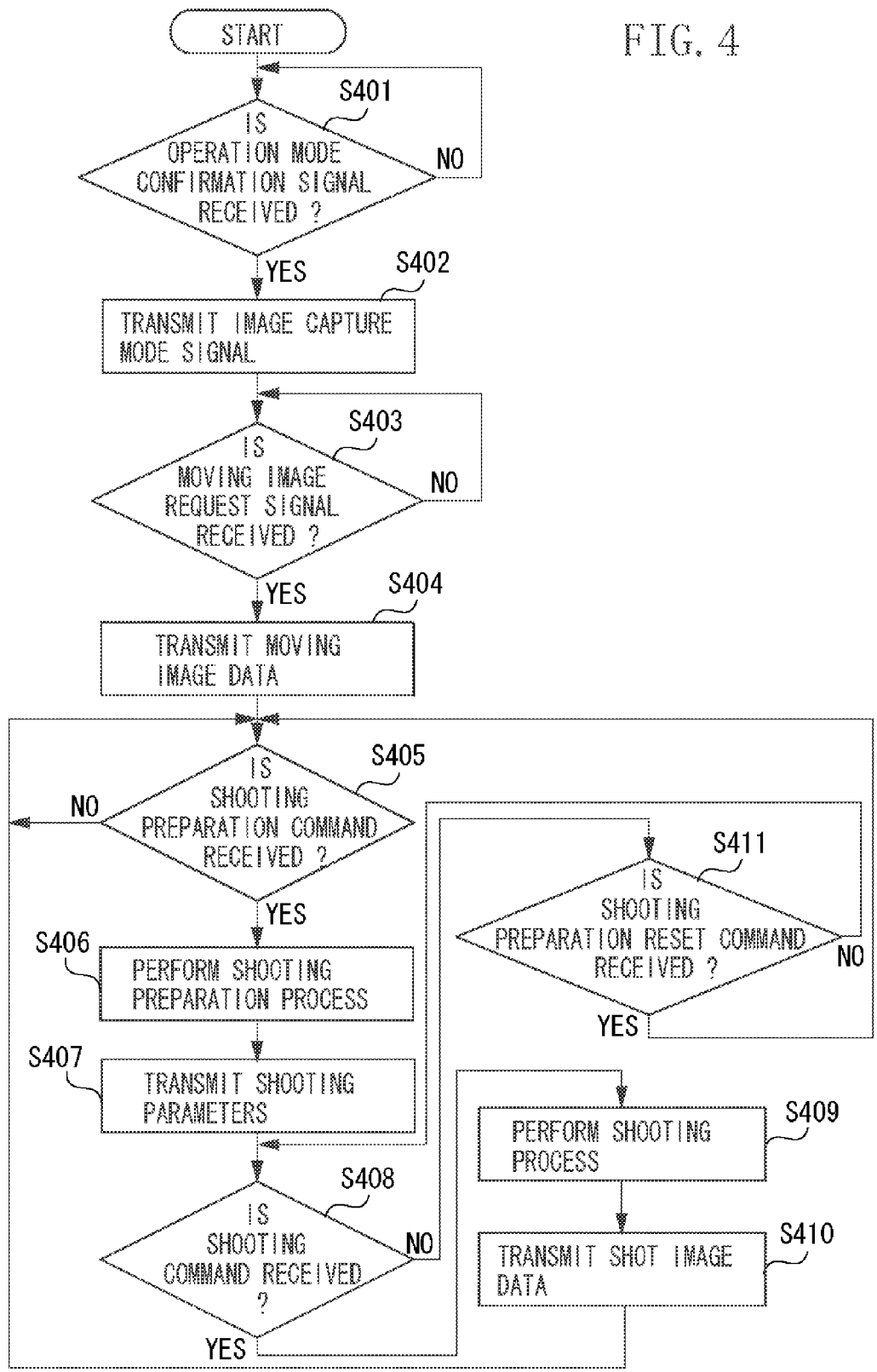
FIG. 4 is a flowchart illustrating an example of process performed by an image capture apparatus according to the first exemplary embodiment of the present invention.

Process performed by the camera 200 in the control system will be described with reference to FIGS. 1, 2, and 4. FIG. 4 is a flowchart illustrating an example of process executed when the operation mode of the camera 200 according to the first exemplary embodiment is an image capture mode. The flowchart illustrated in FIG. 4 is executed when the PC 100 and the camera 200 are communicable via the USB cable 300 and when the power supplies of the PC 100 and the camera 200 are turned on. The CPU 201 controls the process illustrated with the flowchart in FIG. 4 by executing the control program stored in the memory 202. The process illustrated with the flowchart of FIG. 4 is executed when the operation mode of the camera 200 is an image capture mode.

When software for remotely controlling the camera 200 by a user operation is designated on the PC 100 and the software is executed, the PC 100 transmits the operation mode confirmation signal to confirm the operation mode of the camera 200. Thus, in step S401, the CPU 201 determines whether the communication unit 204 has received the operation mode confirmation signal. When the CPU 201 determines that the communication unit 204 has received the operation mode confirmation signal (YES in step S401), the present flow chart proceeds to step S402 from step S401. When the CPU 101 determines that the communication unit 103 has not received the operation mode confirmation mode signal (NO in step S401), the present flow chart returns to step S401 from step S401.

In step S402, the CPU 201 generates an image capture mode signal which indicates that the operation mode of the camera 200 is a normal image capture mode (a single shooting mode), and outputs the image capture mode signal to the communication unit 204. The CPU 201 outputs the image capture mode signal to the communication unit 204 to control the communication unit 204 to transmit the image capture mode signal to the PC 100. When the communication unit 204 transmits the image capture mode signal to the PC 100, the present flow chart proceeds to step S403 from step S402. In addition, when the operation mode of the camera 200 is the valve image capture mode or the continuous image capture mode other than the image capture mode, the CPU 201 generates a valve image capture mode signal or a continuous image capture mode signal, and transmits the signal to the PC 100 similar to the image capture mode signal.

In step S403, the CPU 201 determines whether the communication unit 204 has received a moving image data request signal from the PC 100. When the CPU 201 determines that the communication unit 204 has received the moving image data request signal (YES in step S403), the present flow chart proceeds to step S404 from step S403. When the CPU 201 determines that the communication unit 204 has not received the moving image data request signal (NO in step S403), the present flow chart returns to step S403 from step S403.

In step S404, the CPU 201 instructs the image processing unit 207 to add the focus information to the image data. The CPU 201 controls the image processing unit 207 to output, to the communication unit 204, the image data to which the focus information is added. Then, the image processing unit 207 continuously outputs the image data to the communication unit 204 until the CPU 201 issues an instruction for performing the shooting process. Thus, the CPU 201 controls the communication unit 204 to transmit, to the PC 100 via the USB cable 300, the image data which is continuously output, as moving image data, and the focus information added to the image data as auxiliary data. When the communication unit 204 transmits the moving image data and the auxiliary data to the PC 100, the present flow chart proceeds to step S405 from step S404.

In the present exemplary embodiment, when the communication unit 204 transmits the moving image data corresponding to the moving image transmission request coming from the PC 100, the communication unit 204 transmits the focus information only at a time of starting transmission. Further, the CPU 201 issues an instruction to the image processing unit 207 and controls the image processing unit 207 to output, to the communication unit 204, an image data to which the focus information and the range-finding frame are added, and then the image processing unit 207 may continuously output, to the communication unit 204, the image data to which the range-finding frame is added, until the CPU 201 issues an instruction for performing the shooting process. In this condition, the communication unit 204 transmits a message to the PC 100 as an auxiliary data, indicating that an image in the range-finding frame is multiplexed on the image data and transmitted.

In step S404, when the PC 100 receives a notification that an operation mode of the camera 200 is an image capture mode, a user can determine in the display unit 104 that the camera 200 is in a state controllable by the PC 100. Thus, when the PC 100 receives the notification that the operation mode of the camera 200 is the image capture mode, a user may operate the PC 100 to generate a control command for controlling the camera 200 and the PC 100 transmits the control command to the camera 200.

Therefore, in step S405, the CPU 201 determines whether the communication unit 204 has received a shooting preparation command. When the CPU 201 determines that the communication unit 204 has received the shooting preparation command, the CPU 201 sets a shooting preparation flag in the memory 202. For example, when the range-finding frame b is selected and the communication unit 204 receives the shooting preparation command corresponding to the range-finding frame b, the CPU 201 sets, in an item of the range-finding frame b in the memory 202, the shooting preparation flag indicating that an area surrounded by the range-finding frame b is selected as the range-finding area for which the shooting preparation process is executed.

After the CPU 201 sets the shooting preparation flag in the memory 202 (YES in step S405), the flowchart proceeds to step S406 from step S405. After the CPU 201 determines that the communication unit 204 has not received the shooting preparation command (NO in step S405), the flowchart returns to step S405 from step S405.

In step S406, the CPU 201 performs the shooting preparation process by controlling the image processing unit 207 and the imaging unit 208 according to the pixel region of the area surrounded by one of the range-finding frames a to e corresponding to the shooting preparation flag set in the memory 202. As an example, a case that the range-finding frame b corresponds to the shooting preparation flag set in the memory 202 will be described. As for the AF process, the CPU 201 reads an image signal from the pixel region of the area surrounded by the range-finding frame b, extracts a high-frequency component from the image signal, detects the in-focus position of the focus lens at which the high-frequency component is maximum, and adjusts the position of the focus lens.

Further, as for the AE process, the CPU 201 integrates RGB signals from the pixel region of the area surrounded by the range-finding frame b, calculates an exposure value proper for shooting based on the integrated value, and determines a diaphragm value and a shutter speed. After the shooting preparation process is performed in the image processing unit 207 and the imaging unit 208, the flowchart proceeds to step S407 from step S406.

In step S407, the CPU 201 reads, from the memory 202, shooting parameters such as the shutter speed, the diaphragm value, and a white balance value, outputs the shooting parameters to the communication unit 204, and controls the communication unit 204 to transmit the shooting parameters to the PC 100. When the communication unit 204 transmits the shooting parameters to the PC 100, the flowchart proceeds to step S408 from step S407.

After the PC 100 transmits a shooting preparation command to the camera 200, the PC 100 may transmit a shooting command for making the camera 200 to perform the shooting process. In this case, in step S408, the CPU 201 determines whether the communication unit 204 has received the shooting command from the PC 100.

When the CPU 201 determines that the communication unit 204 has received the shooting command, the CPU 201 sets a shooting flag in the memory 202. When the CPU 201 sets the shooting flag in the memory 202 (YES in step S408), the flowchart proceeds to step S409 from step S408. When the CPU 201 determines that the communication unit 204 has not received the shooting command, the flowchart proceeds to step S411 from step S408.

In step S409, the CPU 201 controls the imaging unit 208 to perform shooting process. The imaging unit 208 shoots still image data of one frame according to a command, and holds the shot still image data in the memory 202. Then, the image processing unit 207 performs the aforementioned process on the shot still image data, and the recording unit 203 creates a still image file including the still image data, and stores the still image file in the recording medium 203a.

When the imaging unit 208 performs shooting process, the CPU 201 resets a shooting preparation flag and a shooting flag in the memory 202. When the CPU 201 resets the shooting preparation flag and the shooting flag in the memory 202, the flowchart proceeds to step S410 from step S409.

In step S410, when the still image data shot by the camera 200 is ready for transmitting to the PC 100, the CPU 201 reads the still image file recorded by the received shooting command, from the recording medium 203a by the recording unit 203, and outputs the file to the communication unit 204. The CPU 201 controls the communication unit 204 so as to transmit the read still image file to the PC 100. When the communication unit 204 transmits the still image file to the PC 100, the flowchart returns to step S405 from step S410.

In step S411, the CPU 201 determines whether the communication unit 204 has received a shooting preparation reset command. When the CPU 201 determines that the communication unit 204 has not received the shooting preparation reset command (NO in step S411), the flowchart proceeds to step S408 from step S411. When the CPU 201 determines that the communication unit 204 has received the shooting preparation reset command (YES in step S411), the CPU 201 resets a shooting preparation flag in the memory 202, and controls the image processing unit 207 and the imaging unit 208 to cancel the shooting preparation process.

The image processing unit 207 and the imaging unit 208 interrupts the AF process, the AE process, the EF process, and the AWB process, while holding the shooting parameters, such as the in-focus position, the shutter speed, the diaphragm value, and the white balance correction value, which are acquired by the shooting preparation process performed until canceling the process.

When the CPU 201 controls the image processing unit 207 and the imaging unit 208 to perform the shooting preparation process again, the image processing unit 207 and the imaging unit 208 restart the interrupted process, such as the AF process, the AE process, the EF process, and the AWB process, continuing again the process which is interrupted. When the CPU 201 resets the shooting preparation flag set in the memory 202 in step S405 (NO in step S411), the flowchart returns to step S405 from step S411.

The process from step S401 to step S410 is not performed when the operation mode of the camera 200 is an operation mode other than the image capture mode.

The focus information added to the image data and transmitted to the PC 100 may be transmitted to the PC 100 when the focus lens in an in-focus state in the shooting preparation process and when the shooting preparation process ends.

Figure 5:
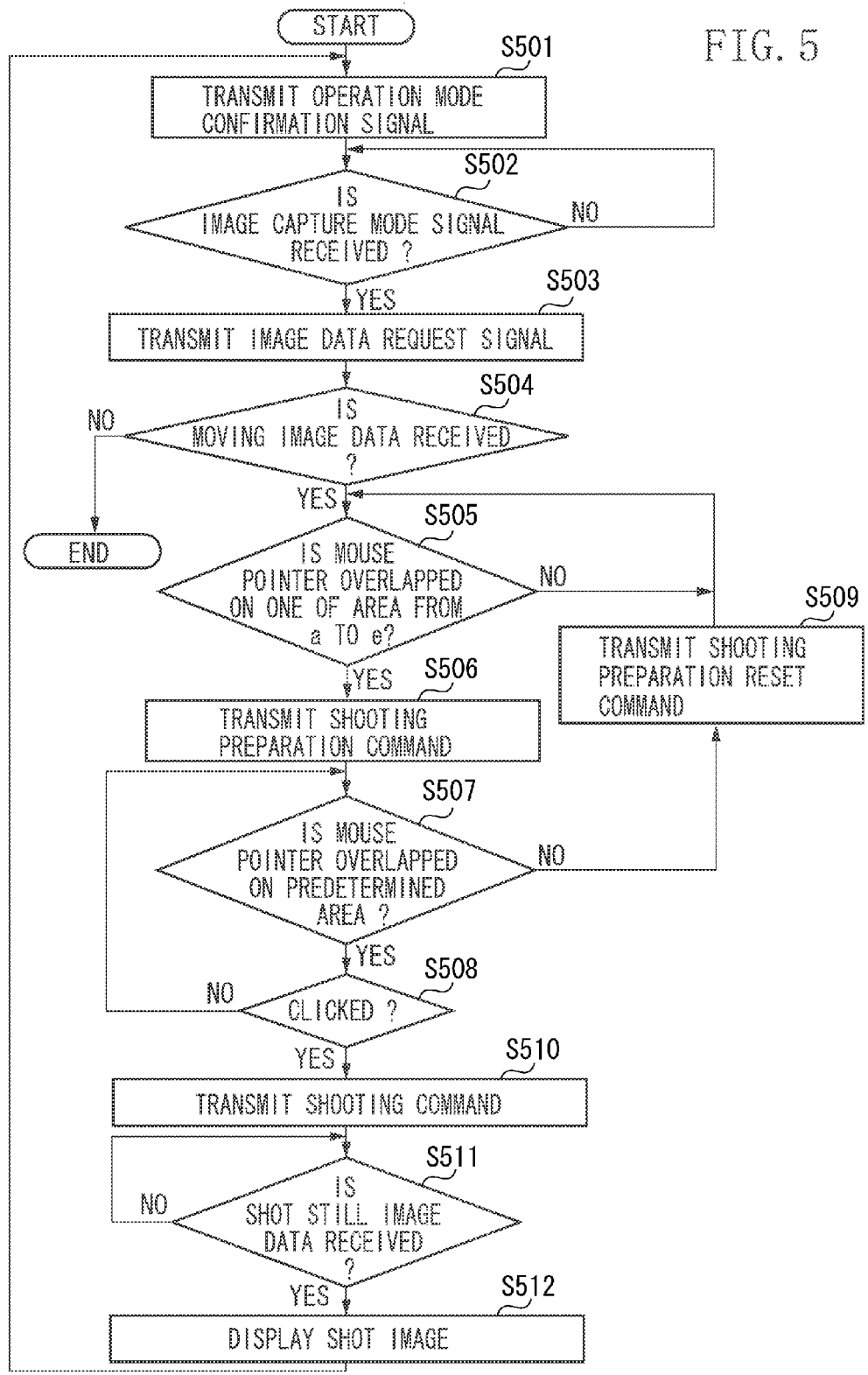
FIG. 5 is a flowchart illustrating an example of process performed by a control apparatus according to the first exemplary embodiment.

Process performed in the PC 100 according to the first exemplary embodiment will be described with reference to FIGS. 1 to 3 and 5. FIG. 5 is a flowchart illustrating an example of process performed by the PC 100 according to the first exemplary embodiment. The process illustrated in the flowchart in FIG. 5 is executed in a state where the PC 100 and the camera 200 are communicable via the USB cable 300 and when the power supplies of the PC 100 and the camera 200 are turned on. The process illustrated in the flowchart in FIG. 5 is executed when an operation mode of the camera 200 is an image capture mode, and is not executed when the operation mode of the camera 200 is an operation mode other than the image capture mode. The CPU 101 controls the process illustrated in the flowchart in FIG. 5 by executing a control program stored in the memory 102. In the first exemplary embodiment, a mouse 105a is used to operate the mouse pointer 500 as an example of a pointing device for operating the mouse pointer 500.

When a user executes software for remotely controlling the camera 200 on the PC 100 in a state where a PC control screen is displayed in the display unit 104, the CPU 101 acquires a camera control screen 400 from the memory 102 and controls the display unit 104 to display the control screen 400. In this case, nothing is displayed in the view area 401, the status display area 402, and the parameter area 403 on the camera control screen 400. If a user operates the PC 100 and controls the camera 200 to shoot, the CPU 101 needs to determine whether the camera is ready for shooting.

In step S501, the CPU 101 generates an operation mode confirmation signal for confirming the operation mode of the camera 200, and outputs the operation mode confirmation signal to the communication unit 103. The CPU 101 controls the communication unit 103 to transmit the operation mode confirmation signal to the camera 200 via the USB cable 300. When the communication unit 103 transmits the operation mode confirmation signal to the camera 200, the flowchart proceeds to step S502 from step S501.

When the camera 200 has received the operation mode confirmation signal, the camera 200 generates a mode signal indicating a current operation mode, and transmits the mode signal to the PC 100.

In step S502, in order to determine whether an operation mode of the camera 200 is an image capture mode, the CPU 101 determines whether the communication unit 103 has received an image capture mode signal from the camera 200. When the communication unit 103 has received the image capture mode signal from the camera 200, the CPU 101 sets a "IMAGE CAPTURE MODE" flag in the memory 102 as information indicating the operation mode of the camera 200. After setting the "IMAGE CAPTURE MODE" flag, the CPU 101 controls the MODE in the parameter area 403 to display "Av mode", and controls the status display area 402 to display "READY FOR SHOOTING" as illustrated in FIG. 3A.

In the present exemplary embodiment, process performed when an operation mode of the camera 200 is a normal image capture mode is described. However, process may also be performed when the operation mode of the camera 200 is the continuous image capture mode or the valve image capture mode.

In addition, when the communication unit 103 has received a continuous image capture mode signal, the CPU 101 controls the MODE in the parameter area 403 to display "Continuous image capture mode". When the communication unit 103 has received a valve image capture mode signal, the CPU 101 controls the MODE in the parameter area 403 to display "Valve mode". Further, if the communication unit 103 has received one of the image capture mode signal, the continuous image capture mode signal, and the valve image capture mode signal, the CPU 101 controls the status display area 402 to display "READY FOR SHOOTING".

When the CPU 101 determines that the communication unit 103 has received the image capture mode signal (YES in step S502), the flowchart proceeds to step S503 from step S502. When the CPU 101 determines that the communication unit 103 has not received the image capture mode signal (NO in step S502), the flowchart returns to step S502 from step S502. Further, when the communication unit 103 receives a signal indicating a different operation mode from the image capture mode signal, for example, a playback mode signal indicating that the operation mode of the camera 200 is a playback mode, the CPU 101 also determines that the communication unit 103 has not received the image capture mode signal. Also in this case, the flowchart returns to step S502 from step S502.

In step S503, the CPU 101 generates an image data request signal for requesting, to the camera 200, a live view image and focus information which are generated by the camera 200. Then, the CPU 101 controls the communication unit 103 to transmit the image data request signal to the camera 200. When the communication unit 103 transmits the image data request signal, the flowchart proceeds to step S504 from step S503.

When the camera 200 receives the image data request signal, the camera 200 transmits, to the PC 100, continuous image data output from the imaging unit 208 and focus information added to the image data. The continuous image data is transmitted as moving image data and the focus information is transmitted as auxiliary data.

Therefore, in step S504, in order to determine whether the communication unit 103 can receive the moving image data from the camera 200, the CPU 101 determines whether the communication unit 103 has received the moving image data and the auxiliary data. When the communication unit 103 has received the moving image data and the auxiliary data from the camera 200, the CPU 101 supplies, to the display unit 104, the moving image data which the communicated unit 103 has received, and analyzes the auxiliary data which the communication unit 103 has received. Based on the analyzed auxiliary data, the CPU 101 acquires focus information relating to the moving image data which the communication unit 103 has received. The CPU 101 superimposes a range-finding frame on the moving image data according to the focus information, and displays the moving image data in the view area 401 as illustrated in FIG. 3A. Hence, the live view image of the camera 200 is displayed in the view area 401.

In addition, when the image of the range-finding frame is multiplexed on the image data transmitted from the camera 200, the PC 200 does not display the range-finding frame. Since the camera 200 transmits data indicating whether the range-finding frame is multiplexed on the image data, as the auxiliary data added to the image data, the PC 200 can determine whether the range-finding frame is multiplexed on the image data using the auxiliary data.

When the view area 401 displays the live view image received from the camera 200 (YES in step S504), the flowchart proceeds to step S505 from step S504. When the CPU 101 determines that the communication unit 103 has not received the moving image data or the auxiliary data from the camera 200, the CPU 101 displays, in the status display area 402, information indicating that shooting cannot be performed by the camera 200 or communication with the camera 200 cannot be performed. When the status display area 402 displays the information indicating that shooting cannot be performed by the camera 200 or communication with the camera 200 cannot be performed, the flowchart ends. Further, process similar to the present exemplary embodiment is also performed when the communication unit 103 cannot receive the moving image data and the auxiliary data.

In step S505, the CPU 101 determines whether the mouse pointer 500 exists in the range-finding area surrounded by each of the range-finding frames a to e. For example, as illustrated in FIG. 3B, when a user operates the mouse 105a in the operation unit 105, on the camera control screen 400 so as to overlap the mouse pointer 500 on the range-finding frame b (this operation is termed mouse over), the CPU 101 determines that the mouse pointer 500 exists in the range-finding frame b.

An example that a user operates the mouse 105a in the operation unit 105, on the camera control screen 400 so as to overlap the mouse pointer 500 on the range-finding frame b (mouse over) will be described.

The CPU 101 acquires coordinate information of the mouse pointer 500, and coordinate information of the range-finding frames a to e acquired as first information from focus information received from the camera 200 in step S504. The CPU 101 determines whether the coordinate information of the mouse pointer 500 acquired as second information exists in an area surrounded by one of the range-finding frames a to e.

When the CPU 101 determines that the coordinate information of the mouse pointer 500 exists in the area surrounded by the range-finding frame b (YES in step S505), the flowchart proceeds to step S506 from step S505. When the CPU 101 determines that the coordinate information of the mouse pointer 500 does not exist in the area surrounded by one of the range-finding frames a to e (NO in step S505), the flowchart returns to step S505 from step S505.

In step S506, when the CPU 101 determines that the mouse pointer 505 exists in the area surrounded by one of the range-finding frames a to e, the range-finding frame b on which the mouse pointer 500 is overlapped is surrounded by a black frame as illustrated in FIG. 3B. In addition, the range-finding frame on which the mouse pointer 500 is overlapped can be surrounded by a frame of other color instead of the black frame, or the color of the entire range-finding frame can be changed instead of surrounding the range-finding frame with the black frame.

When the range-finding frame on which the mouse pointer 500 is overlapped is the range-finding frame b, the CPU 101 generates a shooting preparation command for using the camera 200 to perform shooting preparation, and outputs the shooting preparation command to the communication unit 103. The shooting preparation command corresponding to the range-finding frame b includes an instruction of the shooting preparation to the camera 200, and information indicating that the range-finding frame b is selected from one of the range-finding frames a to e. The CPU 101 controls the communication unit 103 to transmit the shooting preparation command to the camera 200.

Accordingly, when the CPU 101 determines that the mouse pointer 500 exists in the area surrounded by one of the range-finding frames a to e, the CPU 101 generates a shooting preparation command for using the camera 200 to perform the shooting preparation corresponding to the range-finding frame in which the mouse pointer 500 exists. When the communication unit 103 transmits the shooting preparation command to the camera 200, the flowchart proceeds to step S507 from step S506.

When the shooting preparation command is transmitted to the camera 200 and the camera 200 performs the shooting preparation process, the communication unit 103 receives the shooting parameter. Based on information included in the shooting parameter which the communication unit 103 receives, the CPU 101 can determine what kind of process is performed by the camera 200 as the shooting preparation process. Therefore, the CPU 101 reads character information from the memory 102 corresponding to the process which the camera 200 performs, and displays the character information in the status display area 402.

For example, when the camera 200 performs only the AF process, the CPU 101 reads the character information from the memory 102, and displays "AF IS OPERATING" in the status display area 402. Similarly, when the camera 200 performs only the AE process, the CPU 101 reads the character information from the memory 102, and displays "AE IS OPERATING" in the status display area 402. Further, when the camera 200 performs only the AWB process, the CPU 101 reads the character information from the memory 102, and can display "AWB IS OPERATING" in the status display area 402.

After the communication unit 103 transmits the shooting preparation command to the camera 200, and if the mouse pointer 500 still exists in the area surrounded by the range-finding area in which it has been determined that the mouse pointer 500 exists in step S505, the camera 200 continues to execute the shooting preparation process until the camera 200 receives the shooting command. However, if the mouse pointer 500 departs from the area surrounded by the range-finding area in which it has been determined that the mouse pointer 500 exists in step S505, the camera 200 cancels the preparation shooting process. Similarly, when a user operates the mouser 105a to overlap the mouse pointer 500 on other range-finding frame, the camera 200 cancels the shooting preparation process.

Therefore, while the camera 200 performs the shooting preparation process, the CPU 101 needs to determine whether the mouse pointer 500 still exists in the area surrounded by the range-finding frame where the mouse pointer 500 has existed in step S505. Thus, in step S507, the CPU 101 determines whether the mouse pointer 500 still exists in the area surrounded by the range-finding frame in which it has been determined that the mouse pointer 500 exists in step S505. For example, the CPU 101 determines whether the coordinate information of the mouse pointer 500 exists in the area surrounded by the range-finding frame b, like in the process performed in step S505.

When the CPU 101 determines that the coordinate information the mouse pointer 500 exists in the area surrounded (predetermined area) by the range-finding frame where the mouse pointer 500 existed in step S505 (YES in step S507), the flowchart proceeds to step S508 from step S507. When the CPU 101 determines that the coordinate information of the mouse pointer 500 does not exist in the area surrounded by the range-finding frame where the mouse pointer 500 existed in step S505 (NO in step S507), the flowchart proceeds to step S509 from step S507.

In step S508, the CPU 101 determines whether a user clicks (presses) a button of the mouse 105a in the operation unit 105 for operating the mouse pointer 500. When the CPU 101 determines that the user clicks (presses) the button of the mouse 105a (YES in step S508), the flowchart proceeds to step S510 from step S508. When the CPU 101 determines that the user does not click (press) the button of the mouse 105a (NO in step S508), the flowchart returns to step S507 from step S508.

In step S509, the CPU 101 generates a shooting preparation reset command for resetting the shooting preparation process, and outputs the shooting preparation reset command to the communication unit 103. The CPU 101 controls the communication unit 103 to transmit the shooting preparation reset command to the camera 200. Further, the CPU 101 reads the character information from the memory 102, and displays "READY FOR SHOOTING" in the status display area 402. When the communication unit 103 transmits the shooting preparation reset command, the flowchart returns to step S505 from step S509.

In step S510, the CPU 101 generates a shooting command, and outputs the shooting command to the communication unit 103. The CPU 101 controls the communication unit 103 to transmit the shooting command to the camera 200. Further, the CPU 101 reads the character information from the memory 102, and displays "SHOOTING IN PROCESS" in the status display area 402. When the communication unit 103 transmits the shooting command to the camera 200, the flowchart proceeds to step S511 from step S510.

When the PC 100 transmits the shooting command to the camera 200, the camera 200 executes the shooting process in step S409 in FIG. 4 and the process for transmitting a still image file in step S410 in FIG. 4.

Thus, in step S511, the CPU 101 determines whether the communication unit 103 has received the still image file shot by the camera 200 corresponding to the shooting command from the camera 200. When the CPU 101 determines that the communication unit 103 has received the sill-image file from the camera 200 (YES in step S511), the flowchart proceeds to step S512 from step S511. When the CPU 101 determines that the communication unit 103 has not received the sill image file from the camera 200 (NO in step S511), the flowchart returns to step S511 from step S511.

In step S512, the CPU 101 once stores, in the memory 102, the still image file which the communication unit 103 receives from the camera 200. Then, the CPU 101 controls the display 104 to display the still image data included in the still image file for a predetermined period of time. When the display unit 104 has displayed the still image data received from the camera 200 for a predetermined period of time, the flowchart returns to step S501 from step S512.

After the display unit 104 displays the still image data received from the camera 200 for a predetermined period of time, nothing is no longer displayed in the view area 401 and the status display area 402. In addition, the still image data received from the camera 200 is displayed in the view area 401 for 2 to 3 seconds. The predetermined period of time is arbitrarily determined.

As described above, in the control system according to the first exemplary embodiment, a user can control the camera 200 to shoot only by operating a pointing device, such as the mouse 105a, in the range finding frame on the live view screen, which is selected by the user. Therefore, a user can remotely control the camera 200 by a very smooth and easy operation, and can control the camera 200 to perform the shooting preparation process on the image data in the area surrounded by the range-finding frame selected by the user, and the shooting process. Therefore, the user can designate a desired range-finding frame and control the camera 200 to perform the shooting preparation corresponding to the designated range-finding frame. As a result, the user can acquire a desired image.

Further, since the user can control the camera 200 to perform the shooting process, while confirming the live view image in the remote control system, the user can acquire a desired image.

In the first exemplary embodiment, a user designates the range-finding frame b by operating the mouse cursor 500 with the mouse 105a in the camera control screen 400, and controls the camera 200 to perform the shooting reparation process corresponding to the range-finding frame b. However, the operation is not limited to that. Even when a user operates by the mouse 105a to overlap the mouse cursor 500 on an area of one of the range-finding frames a and c to e other than the range-finding frame b, the camera 200 performs the similar shooting preparation process.

In the first exemplary embodiment, the user operates the mouse pointer 500 by the mouse 105a. However, other pointing devices, such as a tablet, a trackball, and a trackpad, can be used, and the keyboard 105b can be also used. Further, the button of the mouse 105a can be a right side button or a left side button, or can be a scroll button.

Then, process performed in the PC 100 according to the second exemplary embodiment of the present invention will be described with reference to FIGS. 1 and 6 to 8. In the second exemplary embodiment, common parts of the first exemplary embodiment will not be described, and only different parts will be described.

Figure 6:
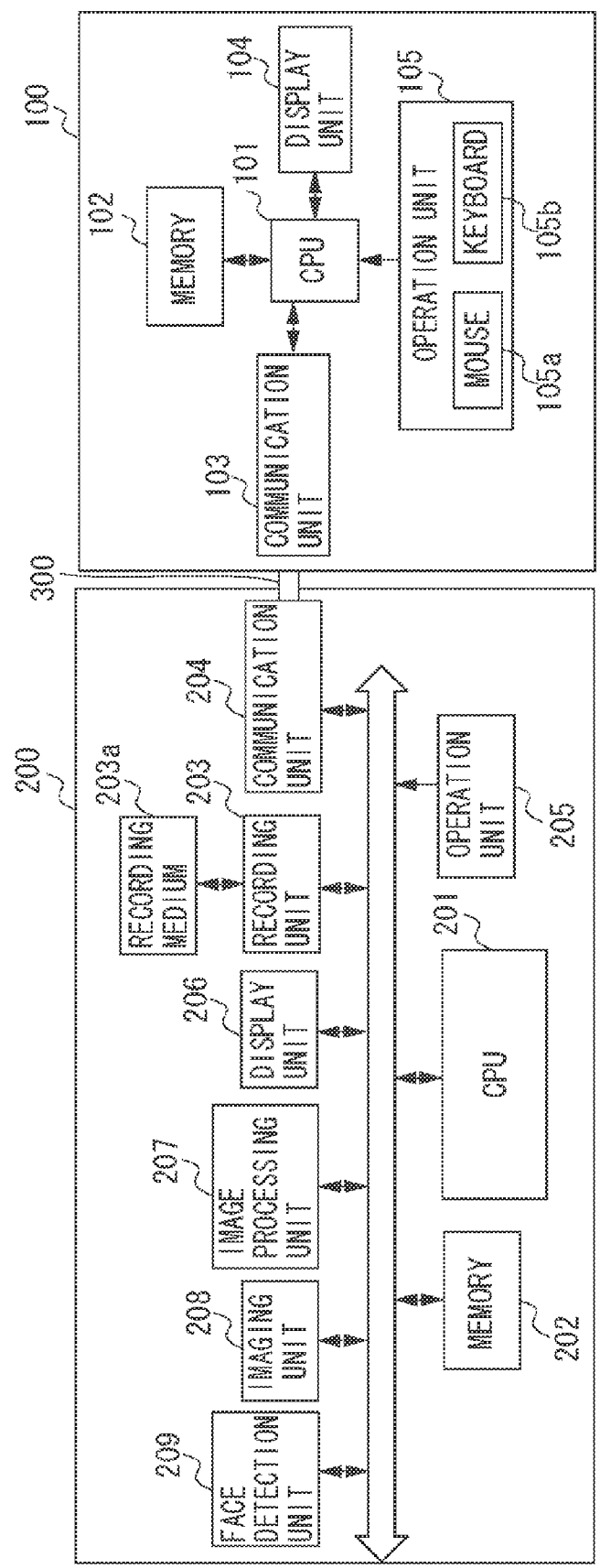
FIG. 6 is a block diagram illustrating an example of a schematic configuration of a remote control system according to the second exemplary embodiment of the present invention.

The second exemplary example has a configuration including a face detection unit 209 as illustrated in FIG. 6. When a face detection function is set to be turned on by a menu button in the operation unit 205, the camera 200 in the second exemplary embodiment can detect a face of an object included in image data (when the object is a person) by the face detection unit 209.

The face detection unit 209 analyzes image data output from the image processing unit, and performs a determination whether there is a person in an object in the image data. Further, when a person exists in an object in the image data, the face detection unit 209 performs face detection process, such as, a determination of a position and a size of the face part of the person. The face detection unit 209 outputs information relating the position and the size of the face of the detected object to the CPU 201.

For example, the face detection unit 209 performs the face detection process by flesh color detection. The flesh color detection includes the steps of determining, in a color space for distinguishing a flesh color from other colors, a range of the flesh color in the color space based on information of the flesh color which is previously sampled, and determining whether a color of each pixel is in the determined range. In addition to this, a face detection method by edge detection or shape pattern detection can be used, and a face detection method by hue detection can be also used.

When the CPU 201 acquires the information indicating a position and a size of a face area from the face detection unit 209, the CPU 201 stores the information in the memory 202, controls the range-finding frame so as to be positioned on the acquired face area, and controls the display unit 206 to display the range-finding frame. The face detection unit 209 continuously writes and updates, in the memory 202, the face information indicating a position and a size of a face area until the imaging unit 208 performs shooting.

Based on the face information detected by the face detection unit 209, the image processing unit 207 controls the range-finding frame so as to be positioned on the face area, and outputs the range-finding frame to the display unit 206. A range-finding frame controlled to be positioned on the face area is termed a face detection frame. The image processing unit 207 outputs the face detection frame to the display unit 206, and the display unit 206 displays the face detection frame which is superimposed on the image data displayed in the display unit 206.

In the first exemplary embodiment, when the mouse pointer 500 exists in an area surrounded by one of a plurality of range-finding frames, the PC 100 transmits a shooting preparation command to the camera 200, and when a user clicks (presses) the button of the mouse 105a, the PC 100 transmits the shooting command to the camera 200.

However, in the second exemplary embodiment, when the mouse pointer 500 exists in the area surrounded by the face detection frame f or g, the PC 100 transmits a shooting preparation command to the camera 200. When the mouse pointer 500 exists in the area surrounded by the face detection frame f or g, and when a user clicks (presses) the button of the mouse 105a, the PC 100 transmits the shooting command to the camera 200.

Therefore, in the second exemplary embodiment, the camera 200 transmits, to the PC 100, image data by adding to every frame of the image data, coordinate information of the face detection frame relative to the image data, a range of the area surrounded by the face detection frame relative to the image data, and the focus information including a number of the face detection frame. The CPU 201 may also control the communication unit 204 to continuously transmit, to the PC 100, the image data to which the focus information is added. Further, the CPU 201 may also control the communication unit 204 to transmit, to the PC 100, the image data to which the focus information is added, when a focus lens is focused by the shooting preparation process and when the shooting preparation process is ended.

When the communication unit 204 has received the image data request signal, the CPU 201 can control the communication unit 204 to transmit, to the PC 100 via the USB cable 300, the image data on which the face detection frame is superimposed.

Figure 7A:
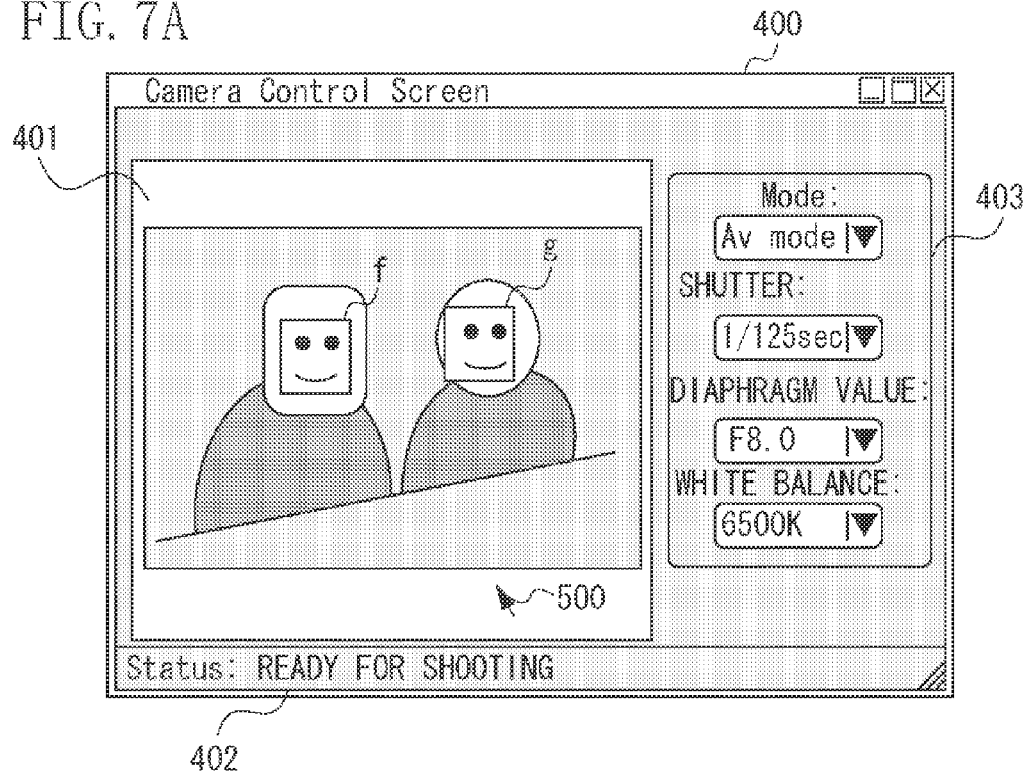
FIGS. 7A and 7B illustrate an example of a camera control screen displayed in a control apparatus according to the second exemplary embodiment of the present invention.

The camera control screen 400 illustrated in FIG. 7 is one of menu screens displayed in the display unit 104, and is stored in the memory 102.

The view area 401 in the camera control screen 400 displays live view image data continuously received in the communication unit 103 from the camera 200. On the live view image data, the face detection frames f and g surrounding the face area added by the camera 200 is displayed superimposed on the live view image.

Next, process performed in the PC 100 according to the second exemplary embodiment will be described with reference to FIGS. 7 and 8.

FIG. 8 is a flowchart illustrating one example of process performed in the PC 100 according to the second exemplary embodiment. Process illustrated in FIG. 8 is process executed when the PC 100 is connected with the camera 200 via the USB cable 300 and the power supplies of the PC 100 and the camera 200 are turned on. In addition, the CPU 101 controls the process illustrated in the flowchart in FIG. 8 by executing the control program stored in the memory 102.

The same numerals are added to the process of the flowchart illustrated in FIG. 8 which is similar to the process of the flowchart illustrated in FIG. 5, and detailed descriptions for the similar process will be omitted. Like the first exemplary embodiment, in the second exemplary embodiment, an operation of the mouse pointer 500 is performed by the mouse 105a as one example of the pointing device for operating the mouse pointer 500.

Figure 7B:
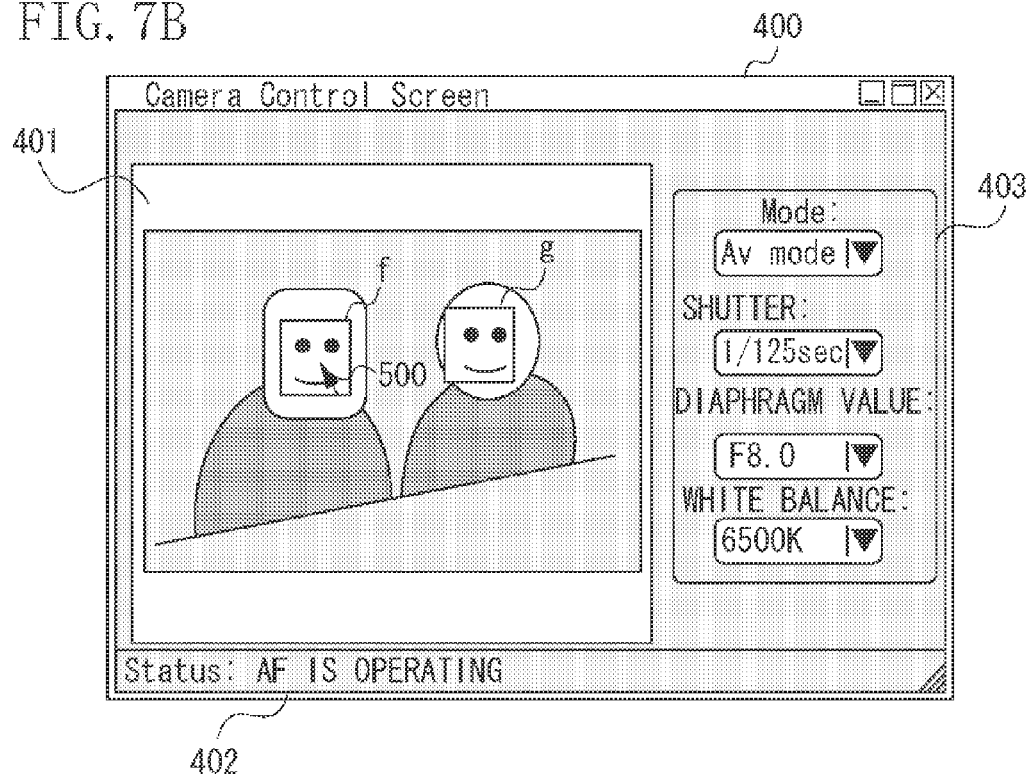

In step S805, the CPU 101 determines whether the mouse pointer 500 exists in the face area surrounded by the face detection frame f or g. For example, when the mouse pointer 500 is operated on the camera control screen 400 by the mouse 105a to be overlapped on the face detection frame f as illustrated in FIG. 7B, the CPU 101 determines that the mouse pointer 500 exists in the face detection frame f. In the second exemplary embodiment, a case that the mouse pointer 500 is operated on the camera control screen 400 by the mouse 105a to be overlapped on the face detection frame f, is described as an example.

The CPU 101 acquires coordinate information of the mouse pointer 500, and coordinate information of the face detection frame f or g based on the focus information received from the camera 200 in step S504. The CPU 101 determines whether the acquired coordinate information of the mouse pointer 500 exists in the area surrounded by the acquired face detection frame f or g.

When the CPU 101 determines that the coordinate information of the mouse pointer 500 exists in the area surrounded by the face detection frame f or g (YES in step S805), the flowchart proceeds to step S806 from step S805. When the CPU 101 determines that the coordinate information of the mouse pointer 500 does not exist in the area surrounded by the face detection frame f or g (NO in step S805), the flowchart returns to step S805 from step S805.

In step S806, when the CPU 101 determines that the mouse pointer 500 exists in the area surrounded by the face detection frame f or g, the face detection frame f on which the mouse pointer 500 is overlapped is surrounded by a black frame as illustrated in FIG. 7B. Further, when the camera 200 performs the AF process, the CPU 101 reads the character information from the memory 102, and displays "AF IS OPERATING" in the status display area 402. Furthermore, when the camera 200 performs the AE process, the CPU 101 displays "AE IS OPERATING" in the status display area 402. In addition, the face detection frame on which the mouse pointer 500 is overlapped can be surrounded by a frame of other color, or the color of the entire face detection frame may be changed instead of surrounding the range-finding frame with the black frame.

When the face detection frame on which the mouse pointer 500 is overlapped is the face detection frame f, the CPU 101 generates the shooting preparation command for using the camera 200 to perform the shooting preparation process corresponding to the face detection frame, and outputs the command to the communication unit 103. The shooting preparation command corresponding to the face detection frame f includes an instruction of the shooting preparation process to the camera 200, and information indicating that the face detection frame f is selected from the face detection frames f and g.

The CPU 101 controls the communication unit 103 to transmit the shooting preparation command to the camera 200. When the CPU 101 determines that the mouse pointer 500 exists in the area surrounded by the face detection frame f or g, the CPU 101 generates the shooting preparation command for using the camera 200 to perform the shooting preparation process corresponding to the face detection frame in which the mouse pointer 500 exists. After the communication unit 103 transmits the shooting preparation command to the camera 200, the flowchart proceeds to step S807 from step S806.

After the communication unit 103 transmits the shooting preparation command to the camera 200, if the mouse pointer 500 still exists in the area surrounded by the predetermined face detection area (predetermined area) in which it has been determined that the mouse pointer 500 exists in step S805, the camera 200 continues to execute the shooting preparation process until receiving the shooting command. However, if the mouse pointer 500 departs from the area surrounded by the face detection area in which it has been determined that the mouse pointer 500 exists in step S805, the camera 200 cancels the preparation shooting process. Similarly, when a user operates the mouse pointer 500 to be overlapped on other face detection frame, the camera 200 cancels the shooting preparation process.

Therefore, while the camera 200 performs the shooting preparation process, the CPU 101 needs to determine whether the mouse pointer 500 still exists in the area surrounded by the predetermined face detection frame where the mouse pointer 500 has existed in step S805.

Thus, in step S807, the CPU 101 determines whether the mouse pointer 500 still exists in the area surrounded by the predetermined face detection frame in which it has been determined that the mouse pointer 500 exists in step S805. For example, the CPU 101 determines whether the coordinate information of the mouse pointer 500 exists in the area surrounded by the face detection frame f, like in the process performed in step S805.

After the CPU 101 determines that the coordinate information of the mouse pointer 500 exists in the area surrounded by the face detection frame where the mouse pointer 500 has existed in step S805 (YES in step S807), the flowchart proceeds to step S508 from step S807. After the CPU 101 determines that the coordinate information the mouse pointer 500 does not exist in the area surrounded by the face detection frame where the mouse pointer 500 has existed in step S805 (NO in step S807), the flowchart proceeds to step S809 from step S807.

Accordingly, when the mouse 105a operates the mouse pointer 500 to be overlapped on the area surrounded by the face detection frame f or g, the PC 100 can instruct the camera 200 to start the shooting preparation process. Then, when a user clicks (presses) the button of the moue 105a while the mouse pointer 500 is overlapped on the face detection frame f or g by the mouse 105a, the PC 100 instructs the camera 200 to start the shooting process.

According to the remote control system of the second exemplary embodiment, a user controls the camera 200 to shoot on the live view image only by operating the mouse 105a in the face detection frame selected by the user. Therefore, the user can remotely control the camera 200 by a smooth and easy operation, and can control the camera 200 to perform the shooting preparation process on the image data in the area surrounded by the face detection frame selected by the user and to perform the shooting process. Therefore, the user can designate a desired face detection frame and control the camera 200 to perform the shooting preparation process corresponding on the designated face detection frame. As a result, the user can acquire a desired image.

Further, a user can control the camera 200 to perform the shooting process, while confirming the live view image in the remote control system. Thus, the user can acquire a desired image.

In the second exemplary embodiment, the user designates the face detection frame f by operating the mouse cursor 500 in the camera control screen 400 using the mouse 105a, and controls the camera 200 to perform the shooting reparation process corresponding to the face detection frame f. However, the operation is not limited to that. When the user operates, with the mouse 105a, the mouse cursor 500 to be overlapped on an area of the face detection frame g other than the face detection frame f, the camera 200 performs the similar shooting preparation process.

Further, the camera 200 can include a changeover unit capable of switching between the range-finding frame or the face detection frame in the display. As a consequence, a user can control the changeover unit to perform a designation of the range-finding area by the mouse cursor 500 on the range-finding frame in the first exemplary embodiment or a designation of the face area by the mouse cursor 500 on the face detection frame in the second exemplary embodiment.

The second exemplary embodiment uses two face detection frames. However, the number of the face detection frames can be determined by a face detection function of the camera 200.

Furthermore, other pointing devices for operating the mouse pointer 500, such as a tablet, a trackball, and a trackpad, can be used other than a mouse 105a, and the keyboard 105b can be also used, like the first exemplary embodiment. Further, the button of the mouse 105a can be a right side button and a left side button, or can be a scroll button.

Other Exemplary Embodiments

The control apparatus 100 according to the present invention is not limited to the control apparatus 100 described in the first and second exemplary embodiments. For example, the control apparatus 100 can be a system including a plurality of apparatuses.

The various process and functions described in the first and second exemplary embodiments can be realized by a computer program. The computer program according to the present invention can be executed by a computer (including a CPU), and the computer program can realize various functions described in the first and second exemplary embodiments.

The computer program according to the present invention can realize the various process and functions described in the first and second exemplary embodiments by using an operation system (OS) working on a computer.

The computer reads the computer program according to the present invention from a computer-readable recording medium, and executes the computer program. The computer-readable recording medium may be a hard disk device, an optical disk, a compact disc read only memory (CD-ROM), a compact disc recordable (CD-R), a memory card, or a read only memory (ROM). The computer program according to the present invention can be provided from an external apparatus via a communication interface, and executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A control apparatus comprising:
a receiving unit that receives a captured image from an image capture apparatus;
a transmitting unit that transmits a command to the image capture apparatus; and
a control unit that (a) performs a process for displaying image data relating to the captured image in an image display area, (b) performs a process for displaying information indicating a plurality of predetermined areas on the image data, (c) determines whether or not one of the plurality of predetermined areas is selected, and (d) determines whether or not a predetermined operating unit is operated while one of the plurality of predetermined areas is selected,
wherein the transmitting unit transmits a first command to the image capture apparatus after one of the plurality of predetermined areas is selected, and the transmitting unit transmits a second command to the image capture apparatus after the predetermined operating unit is operated while one of the plurality of predetermined areas is selected,
wherein the first command is used for causing the image capture apparatus to perform, based on one area selected from the plurality of predetermined areas, a shooting preparation process, and
wherein the second command is used for causing the image capture apparatus to perform a shooting process.

2. The control apparatus according to claim 1, wherein the shooting preparation process includes a process for focusing the image capture apparatus on an object.

3. The control apparatus according to claim 1, wherein the shooting preparation process includes a process for controlling brightness of a captured image.

4. The control apparatus according to claim 1, wherein one of the plurality of predetermined areas is related to a range-finding area.

5. The control apparatus according to claim 1, wherein one of the plurality of predetermined areas is related to an area indicating a face of an object.

6. A control method comprising:
receiving a captured image from an image capture apparatus;
performing a process for displaying image data relating to the captured image in an image display area;
performing a process for displaying information indicating a plurality of predetermined areas on the image data;
determining whether or not one of the plurality of predetermined areas is selected;
transmitting a first command to the image capture apparatus after one of the plurality of predetermined areas is selected, wherein the first command is used for causing the image capture apparatus to perform, based on one area selected from the plurality of predetermined areas, a shooting preparation process;
determining whether or not a predetermined operating unit is operated while one of the plurality of predetermined areas is selected; and
transmitting a second command to the image capture apparatus after the predetermined operating unit is operated while one of the plurality of predetermined areas is selected, wherein the second command is used for causing the image capture apparatus to perform a shooting process.

7. A non-transitory computer-readable storing medium storing a program, wherein the program causes a computer to perform a method, the method comprising:
receiving a captured image from an image capture apparatus;
performing a process for displaying image data relating to the captured image in an image display area;
performing a process for displaying information indicating a plurality of predetermined areas on the image data;
determining whether or not one of the plurality of predetermined areas is selected;

transmitting a first command to the image capture apparatus after one of the plurality of predetermined areas is selected, wherein the first command is used for causing the image capture apparatus to perform, based on one area selected from the plurality of predetermined areas, a shooting preparation process;

determining whether or not a predetermined operating unit is operated while one of the plurality of predetermined areas is selected; and transmitting a second command to the image capture apparatus after the predetermined operating unit is operated while one of the plurality of predetermined areas is selected, wherein the second command is used for causing the image capture apparatus to perform a shooting process.

8. A control apparatus comprising:
a receiving unit that receives a captured image from an image capture apparatus;
a transmitting unit that transmits a command to the image capture apparatus; and
a control unit that (a) performs a process for displaying image data relating to the captured image in an image display area, (b) performs a process for displaying information indicating a first area and a second area on the image data, (c) determines whether or not one of the first area and the second area is selected, and (d) determines whether or not a predetermined operating unit is operated while one of the first area and the second area is selected,
wherein the transmitting unit transmits a first command to the image capture apparatus after one of the first area and the second area is selected, and the transmitting unit transmits a second command to the image capture apparatus after the predetermined operating unit is operated while one of the first area and the second area is selected,
wherein the first command is used for causing the image capture apparatus to perform, based on one area selected from the first area and the second area, a shooting preparation process, and
wherein the second command is used for causing the image capture apparatus to perform a shooting process.

9. The control apparatus according to claim 8, wherein the shooting preparation process includes a process for focusing the image capture apparatus on an object.

10. The control apparatus according to claim 8, wherein the shooting preparation process includes a process for controlling brightness of a captured image.

11. The control apparatus according to claim 8, wherein the first area is related to a first range-finding area, and the second area is related to a second range-finding area.

12. The control apparatus according to claim 8, wherein the first area is related to an area indicating a face of a first object, the second area is related to an area indicating a face of a second object, and the first area is different from the second area.

13. A control method comprising:
receiving a captured image from an image capture apparatus;
performing a process for displaying image data relating to the captured image in an image display area;
performing a process for displaying information indicating a first area and a second area on the image data;
determining whether or not one of the first area and the second area is selected;
transmitting a first command to the image capture apparatus after one of the first area and the second area is selected, wherein the first command is used for causing the image capture apparatus to perform, based on one area selected from the first area and the second area, a shooting preparation process;
determining whether or not a predetermined operating unit is operated while one of the first area and the second area is selected; and
transmitting a second command to the image capture apparatus after the predetermined operating unit is operated while one of the first area and the second area is selected, wherein the second command is used for causing the image capture apparatus to perform a shooting process.

14. A non-transitory computer-readable storing medium storing a program, wherein the program causes a computer to perform a method, the method comprising:
receiving a captured image from an image capture apparatus;
performing a process for displaying image data relating to the captured image in an image display area;
performing a process for displaying information indicating a first area and a second area on the image data;
determining whether or not one of the first area and the second area is selected;
transmitting a first command to the image capture apparatus after one of the first area and the second area is selected, wherein the first command is used for causing the image capture apparatus to perform, based on one area selected from the first area and the second area, a shooting preparation process;
determining whether or not a predetermined operating unit is operated while one of the first area and the second area is selected; and
transmitting a second command to the image capture apparatus after the predetermined operating unit is operated while one of the first area and the second area is selected, wherein the second command is used for causing the image capture apparatus to perform a shooting process.

15. The control apparatus according to claim 1, wherein one of the plurality of predetermined areas is selected by using a pointing device.

16. The control apparatus according to claim 1, wherein the control unit performs, using an operating system, a process for displaying a screen including the image display area.

17. The control apparatus according to claim 1, wherein the control unit performs a process for informing a status of the image capture apparatus.

18. The control apparatus according to claim 1, wherein the shooting preparation process includes a process for correcting a color balance.

19. The control apparatus according to claim 1, further comprising a tablet which is used for selecting one of the plurality of predetermined areas, and wherein the control apparatus is a personal computer.

20. The control method according to claim 6, further comprising performing, using an operating system, a process for displaying a screen including the image display area.

21. The control method according to claim 6, further comprising controlling a personal computer having a tablet which is used for selecting one of the plurality of predetermined areas.

22. The control method according to claim 6, further comprising causing a personal computer to display, using an operation system, a screen including the image display area, wherein the personal computer has a tablet which is used for selecting one of the plurality of predetermined areas.

23. The control apparatus according to claim 8, wherein one of the first area and the second area is selected by using a pointing device.

24. The control apparatus according to claim 8, wherein the control unit performs, using an operating system, a process for displaying a screen including the image display area.

25. The control apparatus according to claim 8, wherein the control unit performs a process for informing a status of the image capture apparatus.

26. The control apparatus according to claim 8, wherein a shooting preparation process includes a process for correcting a color balance.

27. The control apparatus according to claim 8, wherein a shooting preparation process includes a process for correcting a color balance.

28. The control method according to claim 13, further comprising performing, using an operating system, a process for displaying a screen including the image display area.

29. The control method according to claim 13, further comprising controlling a personal computer having a tablet which is used for selecting one of the first area and the second area.

30. The control method according to claim 13, further comprising causing a personal computer to display, using an operation system, a screen including the image display area, wherein the personal computer has a tablet which is used for selecting one of the first area and the second area.

* * * * *